July 20, 1965
C. L. LEHMAN ETAL
3,195,508
GAME AND STOCK FEEDER
Filed July 11, 1963
3 Sheets-Sheet 1
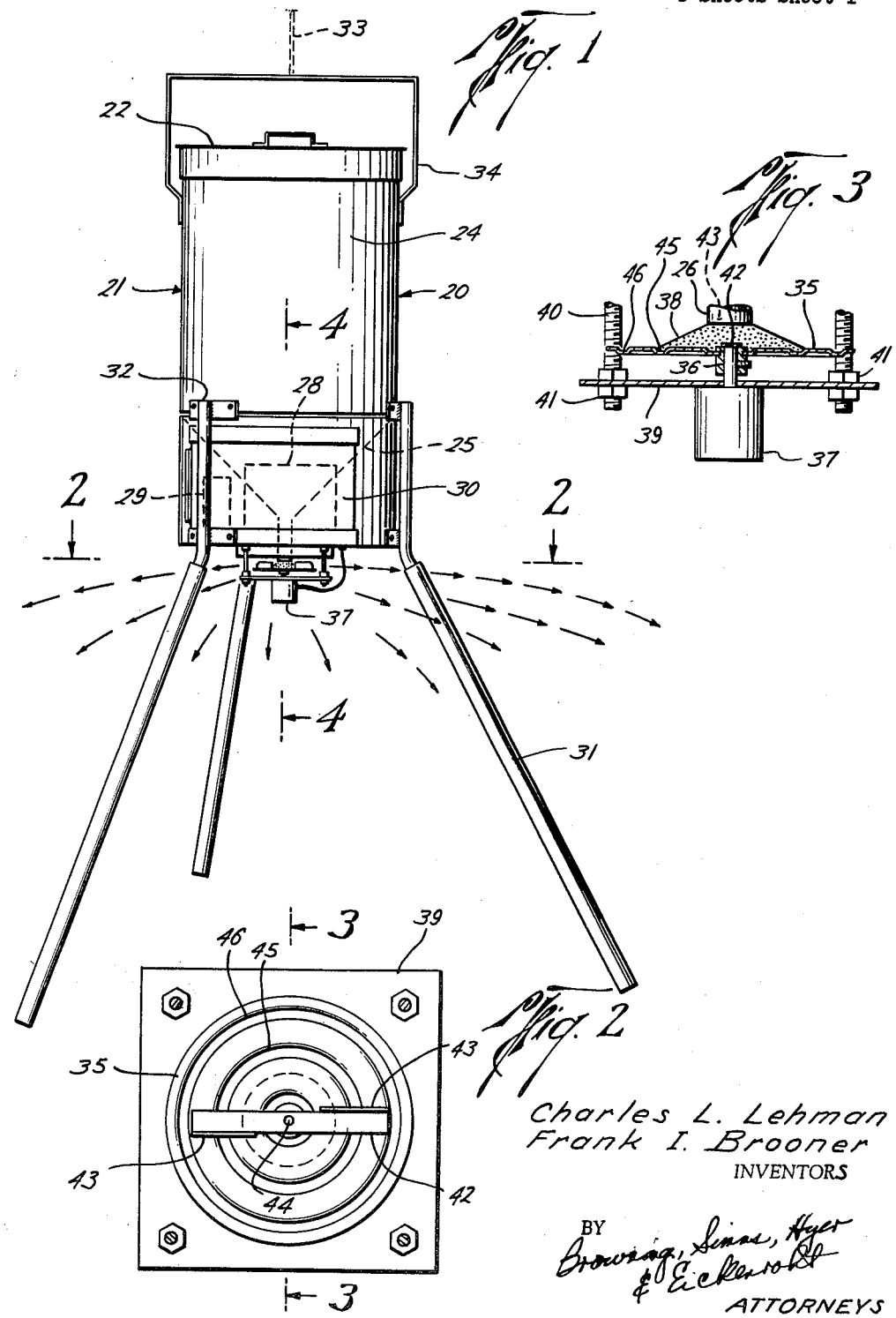
Charles L. Lehman
Frank I. Brooner
INVENTORS
BY
ATTORNEYS July 20, 1965
C. L. LEHMAN ETAL
3,195,508
GAME AND STOCK FEEDER
Filed July 11, 1963
3 Sheets-Sheet 2
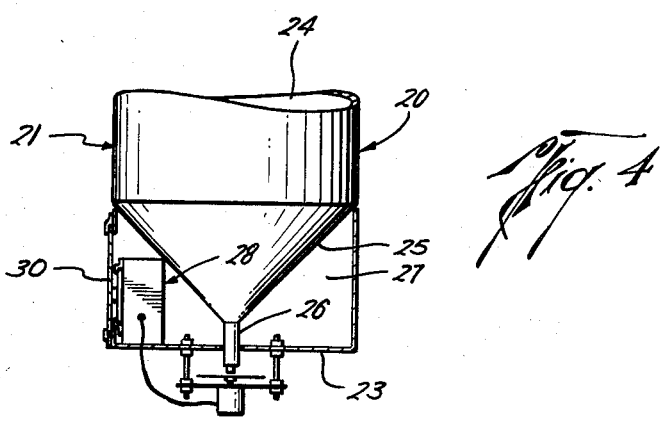
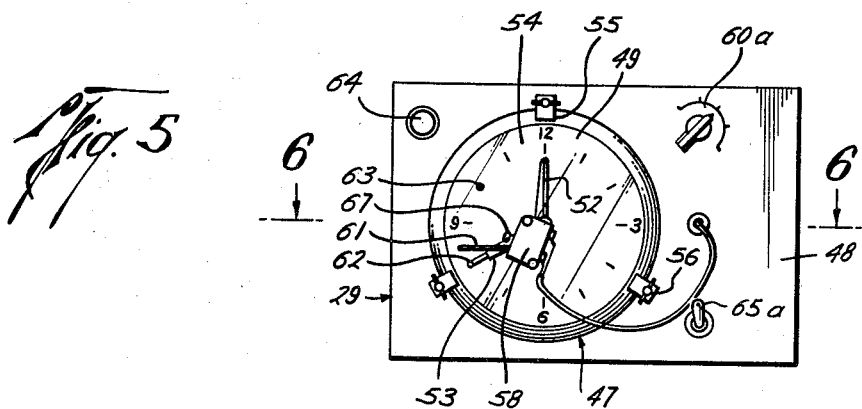
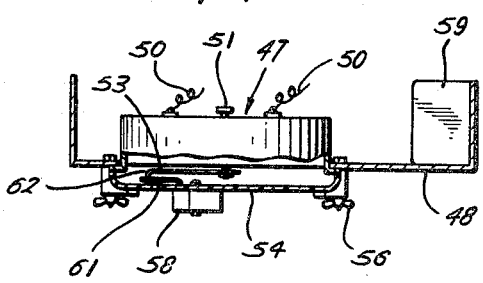
Charles L. Lehman
Frank I. Brooner
INVENTORS
BY
ATTORNEYS July 20, 1965
C. L. LEHMAN ETAL
3,195,508
GAME AND STOCK FEEDER
Filed July 11, 1963
3 Sheets-Sheet 3
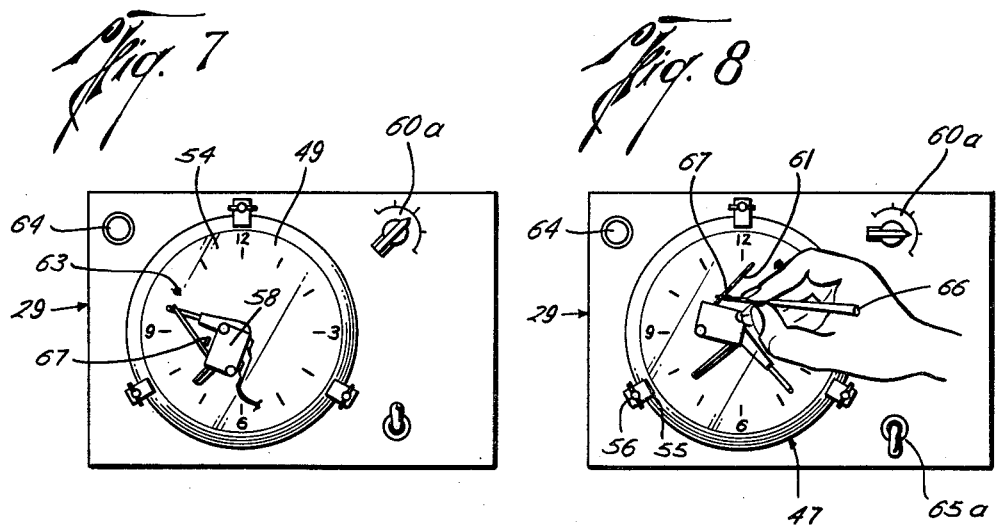
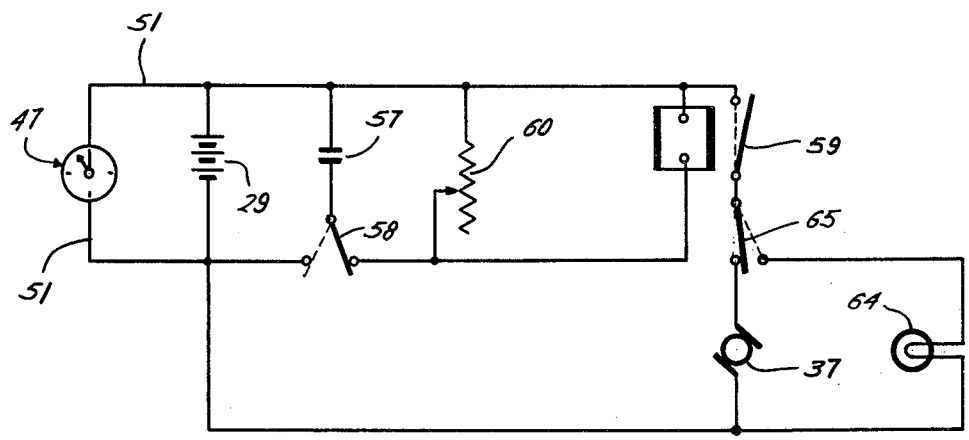
Charles L. Lehman
Frank I. Brooner
INVENTORS
BY
ATTORNEYS

United States Patent Office 3,195,508
Patented July 20, 1965

3,195,508
GAME AND STOCK FEEDER
Charles L. Lehman, Rte. 3, Box 53, and Frank I. Brooner, 1328 3rd St., both of Corpus Christi, Tex.
Filed July 11, 1963, Ser. No. 294,379
5 Claims. (Cl. 119—51.11)

This invention relates generally to a feeder for game and stock; and, more particularly, to improvements in a game and stock feeder of the type which is automatically operable to spread a desired amount of feed at a predetermined time and for a preselected period.

In prior feeders of this general type, the feed has been contained in a hopper supported above ground and having a spout in its lower end arranged above a rotatable disc on which the feed accumulates. When the plate is rotatable by any suitable source of power, such as a battery, the feed is flung outwardly over the ground about the feeder. This rotation is initiated at a desired time and preferably continued for a desired period by means of a timing mechanism of some type.

The obvious advantage of such an automatic feeder is that it does not require that the operator be present. This not only frees the operator for other chores, but also permits feed to be spread in areas which are frequented by game animals, which might otherwise be frightened away by the presence of the operator.

An object of this invention is to provide an automatic game feeder of this type having a timing mechanism which is capable of fine adjustment so as to permit it to be set for very short as well as long periods of operation.

Another object of this invention is to provide such a feeder which is inexpensive to manufacture, particularly in that its timing mechanism is made up of standard parts requiring little if any modification.

Yet another object is to provide such a feeder which is simplified in construction and operation, again especially insofar as the timing mechanism is concerned, so that it may be set and repaired, if necessary, by inexperienced personnel.

A further object is to provide a feeder of the character above described which, upon one setting of the timing mechanism, is capable of many operations over long periods of time, its only practical limitation being the life of the source of power for operating the spreading disc.

Still another object is to provide a feeder of this type which is noiseless except during the brief interval in which it spreads grain, and even then produces only a small amount of noise, so that it is even better suited for use in feeding game.

Other objects, advantages and features of this invention will be apparent to one skilled in the art upon a consideration of the written specification, the attached claims and the annexed drawings.

In the drawings, wherein like reference characters are used throughout to designate like parts:

FIG. 1 is a side elevational view of a feeder constructed in accordance with the present invention and with the projected path of the feed to be spread therefrom being indicated by arrows;

FIG. 2 is a horizontal sectional view of the feeder of FIG. 1, upon an enlarged scale and taken along broken line 2—2 thereof to show the top side of the feed spreading disc;

FIG. 3 is a cross-sectional view of the feed spreading disc shown in FIG. 2, as seen along broken line 3—3 of FIG. 2, and showing the accumulation of feed beneath the lower end of the spout from the hopper and onto the top side of the disc;

FIG. 4 is a vertical cross-sectional view of the lower end of the hopper, as seen along broken line 4—4 of FIG. 1;

FIG. 5 is a front elevational view of the box containing the timing mechanism which is normally housed within the container, such mechanism being set to initiate rotation of the spreading disc at 10 o'clock as indicated on the face of the clock of the mechanism;

FIG. 6 is a horizontal sectional view of the front side of the box of FIG. 5, as seen along broken line 6—6 of FIG. 5;

FIG. 7 is another front elevational view of the timer box, but with the hands of the clock of such device advanced to a point approaching the 10 o'clock starting time;

FIG. 8 is still another front elevational view of the timer box, but during manual manipulation of a switch on the cover over the face of the clock for the purposes of testing the duration of the spreading disc rotation cycle; and FIG. 9 is a wiring diagram of the electrical circuit for the timing mechanism including its connection to the source of power as well as to the motor for rotating the spreading disc.

With reference now to the details of the above-described drawings, the feeder, which is indicated in its entirety by reference character 20, includes a cylindrical container 21 having an open upper end adapted to be closed by a removable cover 22 and a bottom wall 23 (see FIG. 4) at its lower end. As shown in FIG. 4, the upper portion of the container provides a hopper 24 which is adapted to receive feed through the open upper end of the container. This hopper has a conical bottom 25 and a spout 26 which extends through the bottom wall 23 of the container. The annular space 27 between the conical bottom of the hopper and the bottom wall 23 of the container provides a convenient location for a timer box 28 and a battery 29 (see broken lines of FIG. 1) or other suitable source of power. Although these parts are normally enclosed within the space to protect them against weather, dirt, bugs, etc., a sliding door 30 permits access to the space 27 through a window in the lower end of the container.

The container may be mounted above ground level by a series of legs 31 having hollow upper ends for fitting over rods 32 secured to the sides of the container and extending downwardly and outwardly therefrom. Alternatively, the container may be suspended above ground level by means of a chain 33 (see broken lines in FIG. 1) adapted to be hung from a tree limb or other support and having its lower end connected to a strap 34 on the container extending over the top side of the cover 22.

The spreading disc or impeller 35 is connected to the output shaft 36 of motor 37 for rotation therewith and in position to receive feed 38 (see FIG. 3) which flows freely downwardly from the hopper through the lower end of the spout 26. More particularly, the feed will spread into an upright conical pattern until it chokes the lower end of the spout. The motor 37 is in turn supported on the lower side of a plate 39 suspended from the bottom wall 23 of the container by means of four completely threaded bolts 40. As can be best seen from FIG. 3, the nuts 41 holding plate 39 on the lower ends of the bolts 40 may be adjusted as desired to raise or lower the level of the plate and thus the level of the spreading disc 35 with respect to the lower end of the spout 26. Of course, the amount of feed 38 which will accumulate on the disc is proportional to the distance of the top side of the disc from the lower end of the spout, so that the nuts 41 permit the operator to adjust the feeder for spreading greater or lesser amounts of feed. For example, with the disc rotating at 1725 r.p.m., feed has been spreading in circles of 50 to 100 feet depending on the elevation of the disc.

A strap 42 having upstanding wings thereon is secured across the center of the disc 35 by means of a pin 44 so as to dispose the wings at substantially diametrically opposed locations on the disc. More particularly, and as can be seen from FIG. 1, the inner ends of these wings are spaced apart a distance greater than the diameter of the spout 26 so that the disc may be moved up as close to the lower end of the spout as desired. Upon rotation of the disc in a manner to be described, the wings will facilitate spreading of the feed, as indicated by the arrows in FIG. 1, by engaging with the feed as it drops down from the lower end of the spout. As best shown in FIGS. 2 and 3, there are a pair of concentrically arranged grooves 45 and 46 about the top side of the disc. These are useful in containing the feed 38 on the disc when, for example, the container is mounted in something other than a level position.

As shown in FIGS. 5 to 8, a clock 47 is mounted in the front side 48 of the timer box 28 so that the dial face 49 of the clock 47 can be seen by the operator of the feeder upon opening of the door 30. It is contemplated that the clock 47 may be a conventional electric clock having lead lines 50 extending from the back face thereof for connection across the battery 28, as shown diagrammatically in the wiring diagram of FIG. 9, and a thumb screw 51 for setting the minute and hour hands 52 and 53 of the clock, as desired. A transparent cover 54 is removably mounted over the dial face 49 of the clock by means of clamps 55 which are tightened and loosened by means of wing nuts 56. More particularly, and for purposes to be described, the cover 54 is rotatable about the face of the clock when the clamps are loosened so as to permit adjustment of its rotative position with respect to such clock.

With reference now to the wiring diagram of FIG. 9, there is a switch 58 for connecting a condenser 57 across either the battery 29 or the starting relay 59 for the motor 37. Thus, in the broken line position of the switch shown in FIG. 9, the condenser is connected across the battery so as to be charged thereby. Upon return of the switch 58 to the solid line position shown in FIG. 9, the charged condenser is connected across the coil of the relay to close same (as indicated in broken lines) and thereby feed current from the battery to the motor. This, of course, starts the motor so as to rotate the shaft 36 thereof and thus the spreading disc 35, at least for as long as the charge from the condenser holds the relay closed. More particularly, a potentiometer 60 is connected in parallel with the condenser 57 and is adjustable by means of knob 60a on the face of box 29 so as to regulate the speed at which the charge in the condenser is drawn off by the magnetic coil of the relay. This in turn regulates the length of the feed spreading cycle, because, upon opening of the relay 59, the motor and thus rotation of the disc 35 will stop.

As shown in FIGS. 5, 6, 7 and 8, the box of the switch 58 is mounted on the cover 54 over the clock 47 to dispose the end of an arm 61 extending outwardly therefrom on the inside of the cover into the path of the hour hand 53 of the clock. In the normal position of the arm shown in FIG. 5—i.e., prior to its engagement by the hour hand —the switch 58 is in the solid line position shown in FIG. 9 so as to open the circuit connecting the condenser across the battery and close the circuit connecting the condenser across the relay 59. However, when this arm is swung by the hour hand of the clock in a clockwise direction and about its pivotal axis, as shown in FIG. 7, the switch is moved to the dotted line position shown in FIG. 9 so as to connect the condenser across the battery for charging same.

As best shown in FIG. 6, the outer end of the hour hand 53 of the clock is turned outwardly toward the cover 54 to provide a part 62 for engaging with the end of the switch arm 61, as previously described. As will be apparent from a comparison of FIGS. 5 and 7, with the cover 54 rotated so as to dispose the switch arm 61 in the position shown relative to the face of the clock, the part 62 of the hour hand will first engage and move the end of the switch arm 61 a short time prior to 9 o'clock. At this time, the switch 58 is moved to the broken line position of FIG. 9 so that the battery 29 begins to charge the condenser.

Continued movement of the hour hand will continue to swing the switch arm 61 and thus hold the switch 58 in the dotted line position, until approximately 10 o'clock on the face of the clock at which time the end 62 of the hour hand will move over and pass the end of the switch arm. This will release the switch for movement to the solid line position of FIG. 9, whereby the charged condenser actuates the relay 59 and thus starts the motor 37. As an aid to the operator in setting the device for initiating rotation of the spreading disc at a preselected time, there is a marker 63 of some kind on the cover 54 and in advance of the normal position of the switch arm 61 for disposal over such time on the face of the clock. Thus, in the example above described with respect to FIGS. 5 and 7, the marker is disposed over the 10 o'clock location on the clock face.

It will be understood that the switch 58 is a common type of microswitch readily available to the public. Since the switch arm 61 thereof swings in a clockwise direction, in setting the device for starting the spreading of the feed at a certain time, the operator should be careful not to force the switch arm and marker 63 into the desired position by moving the end of the switch arm in advance of the end of the hour hand.

Although a potentiometer is a relatively inexpensive item and thereby contributes toward the accomplishment of the objects of this invention, it is not as accurate as other more expensive devices which might be used for this purpose. Thus, the timing mechanism also includes a means for testing the rate at which the potentiometer permits the holding coil of the relay to drain the condenser. This includes a light 64 or other visual indicator mounted on the face of the box 29 and adapted to be connected into the circuit with the relay and battery by means of a switch 65 disposed between the relay and motor. Thus, when the operator desires to so test the device, he may move the switch 65 into the broken line position of FIG. 9, and thereby determine how long the motor would run with the potentiometer so adjusted by observing the length of time the light burns. As shown in FIGS. 5, 7 and 8, the handle 65a for this switch is also mounted on the face of the box 29 so that the operator may move it between its solid line position in which the handle is turned up, as shown in FIGS. 5 and 7, and its broken line position, in which the handle is in the down position of FIG. 8.

In the use of this means for testing the potentiometer, the operator may grasp a tool 66 having a small end which is insertable through a hole 67 in the cover 54 over the face of the clock, as shown in FIG. 8, so as to permit the operator to thereby move the switch 58 to its broken line position. Since only a short length of time is required in charging the condenser 57 by means of the battery 59, the operator need hold the switch arm only momentarily. Upon releasing it and withdrawing the end of the tool 66 from the hole 67, the operator may then throw the switch 65 to its broken line position, whereby the charged condenser 57 will actuate the relay and thereby cause the light to burn for a length of time which the operator will observe.

If this time is greater or smaller than desired, the operator may adjust the position of the potentiometer 60 by means of the knob 60a with reference to the dial adjacent thereto, and then repeat the manual movement of the switch arm for the purpose of again observing the length of time which the light burns and thus the length of time which the operator may expect the motor 37 to be run. Then, when the potentiometer is adjusted to the satisfaction of the operator, he may turn the handle 65a of the switch 65 upwardly so as to move such switch to the solid line position, whereby the timing device is prepared for initiating rotation of the spreading disc in the manner previously described.

We have found that this feeder may be operated satisfactorily in the manner above described by means of a 6-volt battery and motor, a 5,000 ohm relay, a 3,000 microfarad condenser and a 50,000 ohm potentiometer. If desired, the operator may use a larger condenser to permit the feeder to be set for a longer spreading cycle, without at the same time affecting the capability of the feeder to be set for a short cycle. Also, and as previously mentioned, the switch 58 may comprise any standard microswitch usable in similar environments. Still further, the electric clock 47 may be one of standard variety, requiring only the aforementioned modification of its hour hand.

The spreading disc may be caused to rotate two or more times during the day in one or both of two ways. For example, the switch 58 may be provided with two or more arms spaced so as to be engaged by the hour hand on the clock at desired intervals. On the other hand, if desired, the clock may be of a type for completing a cycle of rotation in twelve hours or some other fraction of a complete day.

From the foregoing it will be seen that this invention is one well adapted to attain the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a timing device for a feeder, comprising a container adapted to be mounted in an upright position and having a spout in its lower end, and a disc rotatably mounted beneath the spout to receive feed from the container; a clock, a battery, a condenser, a motor having a starting relay connected with the battery, an electrical circuit including a switch normally disposed in a first position connecting the condenser with the relay to close same when the condenser has been charged and thereby start the motor and movable to a second position connecting the battery across the condenser for charging same, means mounting the switch for engagement by a hand of the clock, during running of same, to move said switch from the first to the second position and then release it for return to said first position, whereby said condenser is charged and said motor is started to initiate rotation of said disc, and means for adjusting the position of said switch about the face of said clock so as to determine the time at which said disc is rotated, said electrical circuit also including a potentiometer for adjusting the rate at which the condenser is drained by the relay and thus the length of time which the disc is rotated.

2. In a timing device for a feeder of the character defined in claim 1, wherein there is a cover rotatably mounted over the face of the clock, and said switch includes a box carried generally centrally on the cover and an arm extending from the box and having an end disposed in the path of the hand of the clock for pivotal swinging between said first and second positions as said hand engages and moves against said arm.

3. In a timing device for a feeder of the character defined in claim 2, including indicia on the cover in advance of the switch arm for correlation with the dial of the clock to permit selection of the time at which rotation of the disc is to be initiated.

4. In a timing device for a feeder of the character defined in claim 1, wherein said circuit also includes another switch for disconnecting the relay from the motor and connecting it with a test signal, and including means for actuating the first-mentioned switch independently of the clock hand, so that when the condenser is charged, and relay is so connected across said test signal, the operator may determine the length of time which the motor shaft will be rotated.

5. In a timing device for a feeder of the character defined in claim 4, wherein there is a cover over the face of the clock rotatable with respect thereto, and said switch includes a box carried generally centrally on the cover and an arm extending from the box and having an end disposed in the path of the clock hand for pivotal swinging between first and second positions, and said cover has a hole therein to permit access to the said switch arm for so actuating same independently of the clock hand.

References Cited by the Examiner

UNITED STATES PATENTS

| 1,239,404 | 9/17 | Knoll | 119—51.15 |
| 1,533,796 | 4/25 | Genuit | 119—51.11 |
| 2,314,109 | 3/43 | Smith | 119—56 |
| 3,005,942 | 10/61 | Perdreauz et al. | 320—1 |

SAMUEL KOREN, *Primary Examiner.*

HUGH R. CHAMBLEE, *Examiner.*